US012467234B2

(12) United States Patent
Varshosaz

(10) Patent No.: US 12,467,234 B2
(45) Date of Patent: Nov. 11, 2025

(54) ELECTRICAL MOTOR CONTROL FOR HIGH PERFORMANCE HYDRAULIC SYSTEMS

(71) Applicant: HUSQVARNA AB, Huskvarna (SE)

(72) Inventor: Masoud Varshosaz, Sävedalen (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/280,095

(22) PCT Filed: Feb. 28, 2022

(86) PCT No.: PCT/SE2022/050203

§ 371 (c)(1),
(2) Date: Sep. 1, 2023

(87) PCT Pub. No.: WO2022/186753

PCT Pub. Date: Sep. 9, 2022

(65) Prior Publication Data

US 2024/0151005 A1 May 9, 2024

(30) Foreign Application Priority Data

Mar. 4, 2021 (SE) .................................... 2150252-1

(51) Int. Cl.
*E02F 9/22* (2006.01)
*E02F 9/20* (2006.01)
(Continued)

(52) U.S. Cl.
CPC ............ *E02F 9/2246* (2013.01); *E02F 9/207* (2013.01); *E02F 9/2221* (2013.01); *F04B 17/03* (2013.01);
(Continued)

(58) Field of Classification Search
CPC ......... E02F 9/207; E02F 9/221; E02F 9/2246; F04B 17/03; F04B 49/20; F04B 2203/0207; F15B 2211/605; F15B 2211/633
See application file for complete search history.

(56) References Cited

U.S. PATENT DOCUMENTS 3,999,387 A 12/1976 Knopf
5,951,258 A 9/1999 Lueschow et al.
(Continued)

FOREIGN PATENT DOCUMENTS

CN 102918305 A 2/2013
CN 103890409 A 6/2014
(Continued)

OTHER PUBLICATIONS

International Search Report and Written Opinion for International Application No. PCT/SE2022/050203 mailed May 3, 2022.
(Continued)

*Primary Examiner* — Matthew Wiblin
(74) *Attorney, Agent, or Firm* — Burr & Forman

(57) ABSTRACT

A control unit (150) for controlling a hydraulic system on a construction machine (100), where the hydraulic system comprises a hydraulic pump arrangement with an electric drive motor configured to drive a hydraulic pump at a controllable drive torque, wherein the control unit (150) is arranged to obtain a load pressure of at least one actuator in the hydraulic system, to convert the obtained load pressure into a corresponding torque, and to control the electric drive motor to generate the torque.

19 Claims, 2 Drawing Sheets

(51) Int. Cl.
*F04B 17/03* (2006.01)
*F04B 49/20* (2006.01)

(52) U.S. Cl.
CPC ...... *F04B 49/20* (2013.01); *F04B 2203/0207* (2013.01); *F15B 2211/605* (2013.01); *F15B 2211/633* (2013.01)

(56) References Cited

U.S. PATENT DOCUMENTS

| | | | | |
|---|---|---|---|---|
| 6,293,765 | B1 | 9/2001 | Peterson | |
| 2009/0293468 | A1 | 12/2009 | Kim | |
| 2011/0265467 | A1 | 11/2011 | Kawasaki | |
| 2013/0189118 | A1 | 7/2013 | Cochran et al. | |
| 2017/0089038 | A1 | 3/2017 | Takahashi et al. | |
| 2018/0291895 | A1 | 10/2018 | Afshari | |
| 2019/0194910 | A1* | 6/2019 | Takahashi | E02F 9/22 |
| 2019/0345695 | A1* | 11/2019 | Kumeuchi | E02F 9/2095 |
| 2020/0224389 | A1* | 7/2020 | Takahashi | E02F 9/2246 |
| 2021/0025139 | A1 | 1/2021 | Legner | |

FOREIGN PATENT DOCUMENTS

| | | | | |
|---|---|---|---|---|
| EP | 2518219 | A1 | 10/2012 | |
| EP | 2541070 | A1 | 1/2013 | |
| JP | 2013100864 | A | 5/2013 | |
| WO | WO-2014189445 | A1 * | 11/2014 | B60K 25/00 |
| WO | 2015094024 | A1 | 6/2015 | |
| WO | 2015189324 | A1 | 12/2015 | |
| WO | WO-2020040684 | A1 * | 2/2020 | E02F 3/966 |

OTHER PUBLICATIONS

Search Report and Office Action for Swedish Application No. 2150252-1 mailed Sep. 29, 2021.

“Hydraulic and Pneumatic Transmission”, Zou Bing Yan, Beijing, China Railway Publishing House, p. 57, Aug. 31, 2020.

* cited by examiner

ELECTRICAL MOTOR CONTROL FOR HIGH PERFORMANCE HYDRAULIC SYSTEMS

TECHNICAL FIELD

The present disclosure relates to construction machines such as remotely controlled demolition robots, excavators, and the like. There are disclosed control units, construction machines and methods associated with a faster response to input control commands.

BACKGROUND

Many types of construction machines, such as remote-controlled demolition machines and excavators are controlled by an operator using joysticks or other manual control input arrangements. It is important that the actuator latency, i.e., the delay measured from the time instant a control command is given to the corresponding response by the actuator, is kept at a minimum. Too large control latencies hamper machine handling in general and may limit the accuracy with which the operator can use the machine. Also, too much latency may result in that an operator over-steers an actuator which is undesired.

Many hydraulic control systems available on the market today are based on control messaging between different units via various data busses, such as Controller Area Network (CAN) busses. Some of these communication interfaces are relatively slow which limits control bandwidth of the overall hydraulic system.

A Programmable Logic Controller (PLC) used, e.g., for digital processing of measurement data in a hydraulic system and for various control-related computations may introduce further delays in the system. This may, for instance, be the case if a PLC is used to control one or more hydraulic pumps based on pressure data received from the system.

There is a need for hydraulic systems which are able to respond more rapidly to changes in operating conditions.

SUMMARY

It is an object of the present disclosure to provide methods and devices for improved construction machine handling. This object is at least in part obtained by a control unit for controlling a hydraulic system on a construction machine. The hydraulic system comprises a hydraulic pump arrangement with an electric drive motor configured to drive a hydraulic pump at a controllable drive torque and/or controllable drive speed, wherein the control unit is arranged to obtain a load pressure of at least one actuator in the hydraulic system, to convert the obtained load pressure into a corresponding target drive torque and/or target drive speed, respectively, and to control the electric drive motor to generate the target drive torque or the target drive speed. This provides for a faster and more energy efficient control of the electric drive motor. This faster control is mainly due to that the control unit configures the target drive torque directly in dependence of load pressure instead of via a slow feedback loop. Due to this direct control of the electric drive motor, dynamic torque may be accounted for and the full capacity of the motor drive circuits can be better exploited. Also, the responsiveness of the hydraulic system to changes in system state is improved, and the overall function of the construction machine is improved as a consequence.

According to aspects, the load pressure corresponds to a maximum load pressure in the hydraulic system and the target drive torque or target drive speed is configured to generate an output pressure from the hydraulic pump in excess of the load pressure by a pre-determined margin pressure. This means that a pressure margin is maintained in the hydraulic system, similar to the delta pressure margin in a load sensing system. This way a more responsive system is obtained.

According to aspects, the load pressure is obtained from a pressure sensor arranged in connection to an actuator constituting a load of the hydraulic system. This represents an efficient and reliable way to obtain data related to the load pressure in the system.

According to aspects, the load pressure is converted into the corresponding target drive torque or target drive speed based on a look-up table (LUT) arranged accessible from the control unit. By using a LUT, the computational burden on the control unit is decreased. Also, accessing the LUT can be done with very low latency.

According to aspects, the load pressure is converted into the corresponding target drive torque or target drive speed based on an analytical relationship between load pressure and torque. This analytical relationship may be more accurate compared to, e.g., a LUT implementation, which is an advantage. The analytical function can also be used in combination with the LUT.

According to aspects, the corresponding target drive torque of the drive motor is compensated for a delta-pressure of a load sensing hydraulics system.

According to aspects, the control unit is arranged to receive a signal from a pressure sensor arranged to measure an actual pump output pressure, and to verify that the actual pump output pressure is within an acceptable range from an expected pump output pressure resulting from the corresponding target drive torque or target drive speed. This way a feedback path is established, and the maximum system pressure can be limited. The feedback can be used to calibrate the control algorithm and also for verifying that the pump is delivering pressure as expected. For instance, according to an example, the control unit can be arranged to adjust a mapping between load pressure and the corresponding target drive torque or target drive speed based on the actual pump output pressure.

According to aspects, the control unit is also arranged to detect a type and/or identification of the hydraulic pump and to configure the mapping between load pressure and corresponding target drive torque or target drive speed based on the pump type and/or identification. This way the control algorithm can be customized to a given hydraulic pump, with an improved performance as a result.

According to aspects, the control unit is configurable in a first mode of operation and in a second mode of operation, where the first mode of operation and the second mode of operation are associated with different mapping between load pressure and corresponding target drive torque or target drive speed. The first mode of operation may be associated with an energy conserving mode of operation, while the second mode of operation may be associated with a boost mode of operation which can be used temporarily in case increased performance is desired for some reason.

There are also disclosed herein hydraulic systems, construction machines, processing circuits, computer programs, computer program products as well as methods associated with the advantages mentioned above.

Generally, all terms used in the claims are to be interpreted according to their ordinary meaning in the technical field, unless explicitly defined otherwise herein. All references to “a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
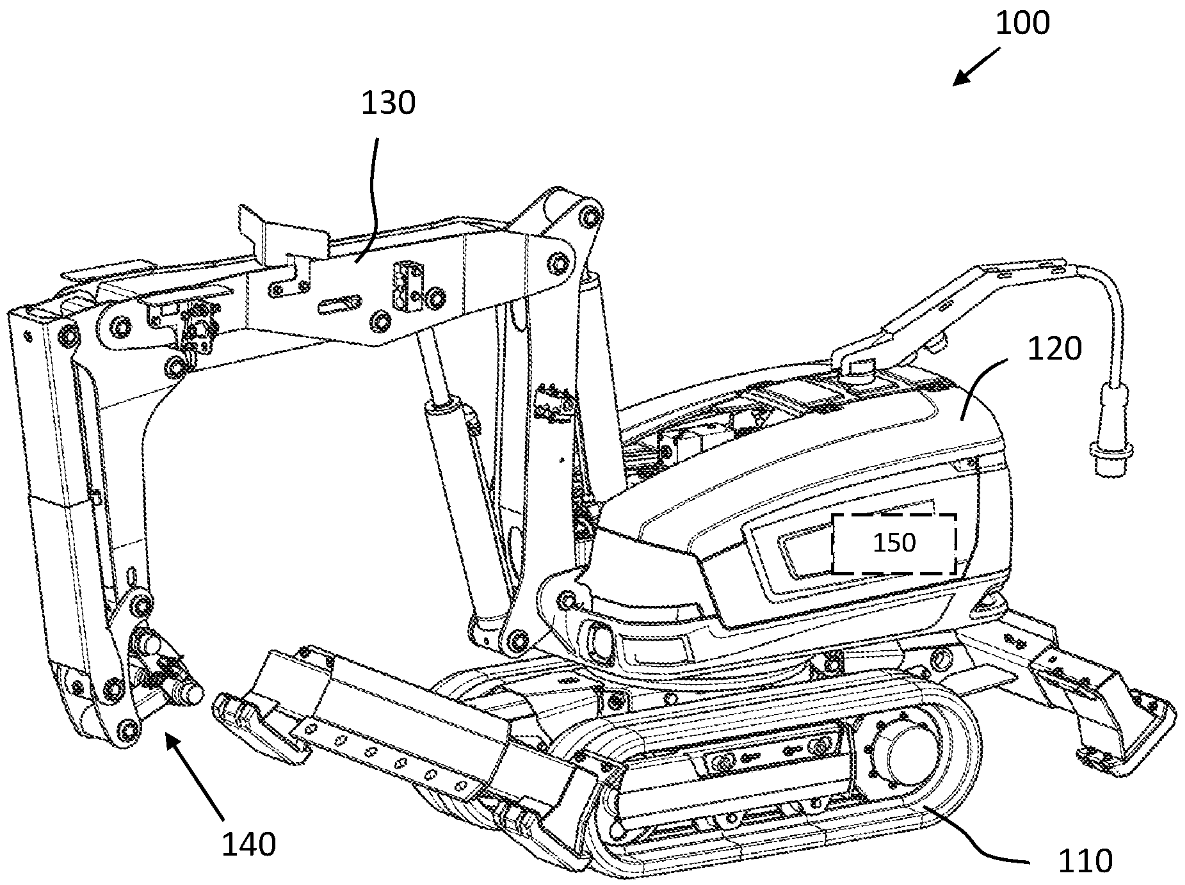
FIG. 1 shows an example demolition robot.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

The present disclosure relates to controlling one or more actuators on a construction machine, such as a boom or stick motion, a body swing, and/or caterpillar tracks or drive wheel motion. The present disclosure also relates to controlling various construction tools which can be mounted on the construction machine, such as hammers and the like mounted on the arm of a demolition robot. It is appreciated that the control arrangements and methods disclosed herein can be used with advantage in demolition robots, and in particular in remote controlled demolition robots. However, many of the techniques discussed herein are also applicable in other types of construction machines, such as excavators and the like. The techniques disclosed herein are also applicable in construction machines arranged for autonomous operation.

The techniques disclosed herein provide a faster response by the pump drive motor compared to previously known techniques. This faster response is mainly due to a control unit which is arranged to obtain a load pressure of at least one actuator in the hydraulic system, to convert the obtained load pressure into a corresponding target drive torque (and/or a target drive speed), and to control the electric drive motor to generate the target drive torque. Thus, the control unit directly translates between load pressure and target torque, which means that the drive circuit for the motor is more or less instantaneously configured to generate the correct torque, including, e.g., dynamic torque components and the like. The motor control to achieve the target torque is closer to the motor and therefore much faster. This, in turn, means that the full capacity of the motor drive circuit can be better exploited which also results in a more maneuverable and/or responsive drive unit control.

FIG. 1 illustrates a remote controlled demolition robot, which is an example of a construction machine 100. The demolition robot comprises tracks 110 for propelling the robot over ground. A body 120 is rotatably mounted on the bottom section which comprises the tracks. An arm 130, sometimes referred to as tool carrier, extends from the body 120. Various tools, such as pneumatic or hydraulic hammers, buckets, cutters, and the like can be carried by the arm 140. These actuators are arranged to be controlled by a control unit 150 which is only schematically illustrated in FIG. 1. Most construction machines 100 comprise actuators which are hydraulically powered. The control unit 150 controls actuator valves and one or more hydraulic pumps to trigger actions by the different actuators.

Figure 2:
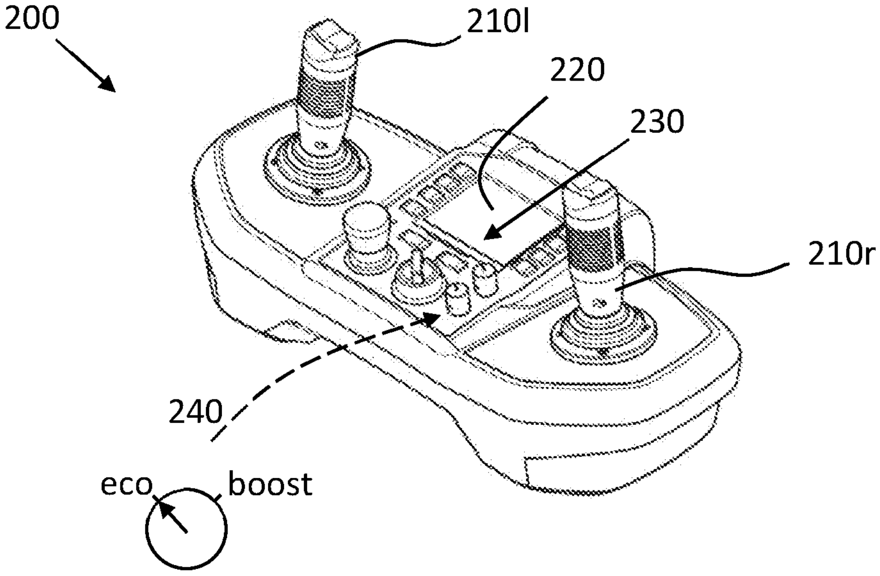
FIG. 2 shows an example remote control device.

The control unit 150 may be arranged for remote control, in which case the control device receives control input from a remote control device 200, exemplified in FIG. 2. The construction machine 100 may also be arranged for autonomous operation or semi-autonomous operation, in which case the control unit 150 generates the control commands for the different actuator internally to complete a pre-determined task.

The control device 200 illustrated in FIG. 2 comprises left and right joysticks **210*l*, 210*r*, a display for communicating information to an operator, and a plurality of buttons and levers 230 for controlling various functions on the construction machine 100. The remote control device 200 is configured to communicate with the construction machine 100** via wireless radio link, such as a Bluetooth link, a wireless local area network (WLAN) radio link, or a cellular connection link, such as the cellular access network links defined by the third generation partnership program (3GPP), i.e., 4G, 5G and so on.

Pressure control algorithms for controlling hydraulic pumps in construction equipment 100 such as demolition robots using fixed displacement pumps and variable speed electric drive motors can be done in a closed loop control with the load pressure of the different actuators, or just the highest load pressure, provided to the control unit as feedback from pressure transducers or other types of sensors. The different load pressures reported to the control unit 150 trigger a control action by the control unit 150 which sends a control command to the drive motor, e.g., over a Controller Area Network (CAN) bus or the like. Thus, the drive motor adjusts the output pressure from the hydraulic pump to meet the requirements of the different actuators.

This control loop is rather slow, since it takes time to measure load pressures, to make the necessary control calculations, and transmit messages over the CAN bus to the electric motor controller, thus, hydraulic pump control is slow because the control of the electric motor is slow and not able to respond to fast changes in operating conditions.

A fast response time by the system is needed, e.g., when a cylinder hits an end position, when several actuator control valves close or open at the same time, or when the arm or a tool of the machine hits a physical barrier. The techniques disclosed herein provide a hydraulic system control strategy associated with a decreased response time and improved controllability.

Figure 3:
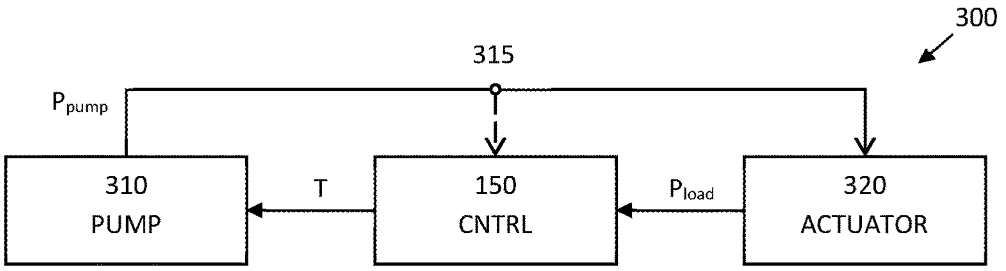
FIG. 3 schematically illustrates a hydraulics control system.

FIG. 3 schematically illustrates a hydraulic system comprising a hydraulic pump 310 and an actuator load 320 (such as a breaker or a cylinder). The load 320 feeds back a load pressure $P_{load}$ to the control unit 150, which controls the hydraulic pump 310 to deliver a hydraulic flow at a pump pressure $P_{pump}$. The pump is suitably a fixed displacement pump, but other types of pumps are of course also possible to use. The pump is driven by a variable speed electric motor.

To speed up the response of the hydraulic pump arrangement 310 to changes in required pump output pressure $P_{pump}$, it is proposed to calculate a torque T which corresponds to a desired pump output pressure to be maintained by the electric drive motor driving the pump by the control unit 150. The variable speed drive motor is then able to maintain an internal high bandwidth control loop 425 which controls the motor output torque to be close to the configured torque T. Thus, there is disclosed herein a control unit 150 for controlling a hydraulic system 300 on a construction machine 100. The hydraulic system 300 comprises a hydraulic pump arrangement 310 with an electric drive motor 420 configured to drive a hydraulic pump 430 at a controllable drive torque T and/or controllable drive speed. The control unit 150 is arranged to obtain a load pressure $P_{load}$ of at least one actuator 320 in the hydraulic system 300, to convert the obtained load pressure $P_{load}$ into a corresponding target drive torque T, and to control the electric drive motor 420 to generate the target drive torque T. It is appreciated that an electric motor can be controlled based on a target drive torque or controlled based on a target drive speed, or a combination of the two. These two control approaches are considered equivalent in this context and will be treated jointly, even though most of the examples given will be given based on a target drive torque.

In other words, with reference to FIG. 3, there is an outer arrangement which measures the load pressure $P_{load}$. This load pressure information is fed to the control unit 150, which performs a conversion between load pressure and target drive torque T. This target drive torque is fed to the pump 310. The pump 310, schematically illustrated in FIG. 4 also has a control arrangement 410 to which the target torque T is fed. This "inner" control loop is much faster than the outer control performed by the control unit 150 and is able to respond faster to transient behavior.

For instance, suppose that a desired target torque is 300 Nm. The inner control may then temporarily drive the motor at a higher torque of, say, 300 Nm+250 Nm during an acceleration phase to then settle at a static torque of 300 Nm.

Some motors are configurable to operate at a controllable drive torque as long as the operation is below a configurable or fixed maximum drive speed. Such motors will not exceed the maximum drive speed regardless of if the target torque has not been obtained, Since this control loop is internal to the motor-pump arrangement and therefore much faster than the traditional control loop discussed above based on a feedback pressure from the load and messages transmitted over a relatively slow communications bus like the CAN bus. The disclosed hydraulic control systems provide fast response time and does not rely on a pressure transducer after the hydraulic pump, although such sensors may be helpful to, e.g., calibrate the system and for redundancy purposes.

Torque control of electric drive motors for hydraulic systems are known, although for different purposes than the present purpose, see, e.g., US2018291895 and US2013189118.

Figure 4:
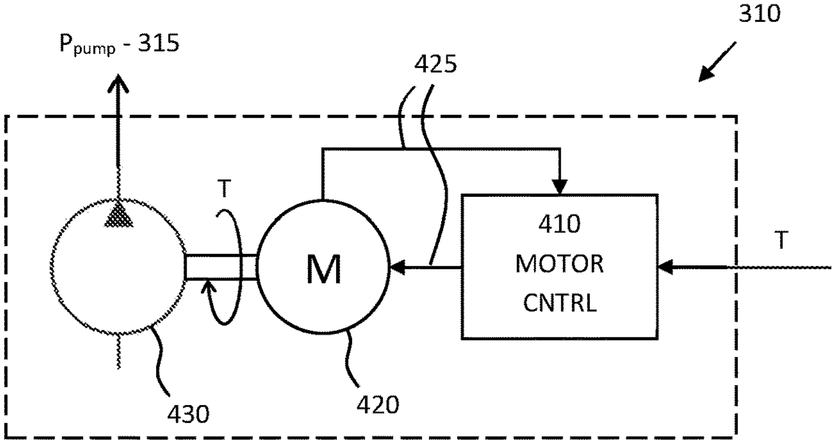
FIG. 4 illustrates a variable speed motor control arrangement.

With reference to FIG. 3 and also to FIG. 4, the load pressure $P_{load}$ of at least one actuator is reported to the control unit 150 as in many conventional solutions, but instead of adjusting an output pump pressure to agree with a desired pump output pressure over a low bandwidth control loop, the desired pump output pressure is instead converted to an equivalent torque value T for the hydraulic pump drive motor which drives the pump. The system pressure can, for instance, be obtained from a pressure sensor arranged in connection to an actuator 320 constituting a load of the hydraulic system 300. The system pressure can also be calculated or otherwise determined from the currently applied motor torque. The motor control unit 410 then controls the variable speed drive motor 420 to maintain the desired torque T over a fast internal control loop 425. The hydraulic pump 430 then outputs a stable hydraulic flow at the desired pump pressure $P_{pump}$.

The electric drive motor 420 is preferably a variable speed electric motor 420 arranged to drive a fixed displacement hydraulic pump 430. However, a variable displacement pump can also be used, although this is not a preferred option in this setting.

Figure 5:
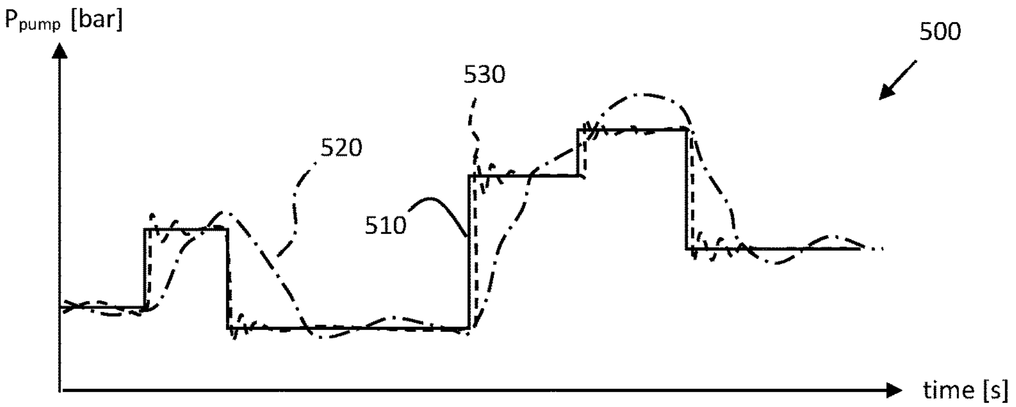
FIG. 5 is a graph illustrating pump pressure as function of time.

FIG. 5 shows a graph 500 illustrating a comparison between two example hydraulic systems. Pump output pressure is shown in the y-axis vs time on the x-axis. An actuator load pressure is plotted by the solid line 510, where it is noticed that this actuator pressure varies over time, e.g., in response to operator commands. The conventional pressure-based control loop comprising messaging over slow CAN-busses and delays in PLC computation is shown by the dash-dotted line 520. It is noted that this control loop is relatively slow in response to the changes in actuator load pressure. The techniques disclosed herein speed up the pump control, among other things by enabling control based on transient effects such as dynamic torque. The proposed hydraulic pump control system is shown by the dashed line 530. Note that the response to changes in actuator load pressure is much faster due to the torque-based control of the electric motor used to drive the pump.

The load pressure $P_{load}$ may correspond to a maximum load pressure in the hydraulic system 300 and the torque T is configured to generate an output pressure from the hydraulic pump 430 in excess of the load pressure by a pre-determined margin pressure. This pre-determined margin may or may not be necessary depending on machine type and machine use-case, and it can vary depending on the specific sequence that the machine is running. The presence or absence of a margin pressure can also be selected by an operator desiring a certain behavior from the hydraulics system. Often, the actuator associated with highest load pressure is known beforehand. Thus, it may be sufficient to configure a single load pressure transducer in the system. There is normally no need for pressure transducers on all actuators in the system, although this may be desired on some types of machines.

The load pressure $P_{load}$ can, for instance, be converted into the corresponding torque T based on a look-up table (LUT) arranged accessible from the control unit 150. This LUT may be stored in a memory device of the control unit and may comprise any number of factors, such as transients like dynamic torque components. A simple LUT may just comprise a few values of actuator load pressure with corresponding torques to be configured, and the control unit can then interpolate between the value pairs to obtain sufficient accuracy in the conversion from load pressure to corresponding torque. Note that the LUT conversion may comprise a bias or margin, such that the output pressure by the pump exceeds the obtained load pressure value.

The load pressure $P_{load}$ can of course also be converted into the corresponding torque T based on an analytical relationship between load pressure and torque. This analytical relationship conversion can be combined with the conversion based on the LUT, e.g., by weighting the corresponding torques, or it can be used separately as a standalone method of mapping pressure to torque.

According to an example, a desired hydraulic pressure P (in bars) from the pump 430 can be converted to torque T (in Nm) as $$T = \frac{V_g P}{20 \pi \eta}$$

where $V_g$ is the displacement per revolution of the pump 430 (in $cm^3$) and η is a unitless hydraulic-mechanical efficiency parameter associated with the hydraulic pump system. In the above expression, the hydraulic tank pressure has been assumed to be at atmospheric pressure. If this is not the case, then a pressure difference $\Delta_P$ should be used instead of the desired pressure output P. The desired output pressure can be determined, e.g., based on some load pressure in the hydraulic system, or some target value configured in dependence of the machine state.

The expression above gives the necessary static torque when the motor speed is constant. When the pump needs to increase or decrease output pressure by acceleration or deceleration by the drive motor, a dynamic element can be added to the expression to improve accuracy and responsiveness. Dynamic torque may, e.g., be calculated as $$T_{dynamic} = \frac{d\omega}{dt} J$$

where J is the sum of moments of inertia of the pump and the electric motor (in $kgm^2$), and ω is a rotational velocity in rad/s of the drive motor axle. The acceleration may be more or less constant or varying in dependence of the current available via the motor drive inverter. For example, to determine how much dynamic torque to add to the static torque, the control unit may first obtain information about the position of the user controls (joysticks, etc), and translate this information into a required motor axle speed. The difference between this required motor axle speed and the current speed then gives the dynamic torque according to the above formula.

The torque to be applied by the drive motor 420 during transient changes in drive speed is then $$T = \frac{V_g P}{20 \pi \eta} + \frac{d\omega}{dt} J$$

In a conventional load sensing system the load sensing delta pressure is around 20 bars higher than the load pressure. This means that if load sensing algorithms are used, pressure (load torque) produced by the pump shall be about 20 bars higher (depending on the hydraulic system design) than the load pressure read, e.g., by the pressure transducer on the actuator. Thus, according to some aspects, the corresponding torque which is configured at the drive motor 420 is compensated for a delta-pressure of a load sensing hydraulics system.

With reference again to FIG. 3, the control unit 150 is optionally arranged to receive a signal from a pressure sensor arranged to measure an actual pump output pressure 315, and to verify that the actual pump output pressure 315 is within an acceptable range from an expected pump output pressure resulting from the corresponding torque T. This expected pump output pressure can be obtained by a reverse use of the above-mentioned LUT or from re-arranging the analytical functions for mapping pressure to torque. The control unit 150 may also be arranged to adjust a mapping between load pressure $P_{load}$ and corresponding torque T based on the actual pump output pressure 315. This mapping, which can be implemented by a look-up table or other type of function, may also be configured in dependence of the rotational velocity of the electric motor, i.e., pump speed, since different pumps normally have a leakage which is a function of the pump speed. Oil temperature may also be accounted for if increased precision is desired. This means that the control unit 315 monitors the pump pressures which result from the torque control. If a discrepancy between the intended output pressure by the pump for a given configured torque or sequence of torques and the actual measured torque is detected, then the conversion can be adjusted. This may, for instance, be achieved by adjusting the LUT, or by adding a correction factor to the analytical expression which is being used to convert load pressure into corresponding torque. For instance, say that an entry in the LUT maps a desired pressure $P_i$ to a corresponding torque $T_i$. The corresponding torque $T_i$ at iteration k can then be adjusted periodically as $$T_i(k) = T_i(k-1) + w(\hat{P}_{pump} - P_{pump})$$

where k−1 denotes the torque value from the previous iteration, w<1.0 is a weighting factor, $\hat{P}_{pump}$ is the desired pump output pressure and $P_{pump}$ is the actual pump output pressure reported by the pressure sensor 315.

In fact, this feedback of pump output pressure in response to various torque settings can be used in an initial calibration routine to populate the LUT with values, or to identify the correct analytical function for mapping desired output pump pressures into motor drive torque. The system then triggers a calibration routine, which may comprise sweeping over a given range of motor drive torques, while monitoring pump output pressure. This way the hydraulic control system does not need to be configured with the mapping function between torque and pump output pressure.

To further improve on the mapping between desired pump output pressure and electric motor drive torque, the control unit 150 is optionally arranged to detect a type and/or identification of the hydraulic pump 430 and to configure the mapping between load pressure $P_{load}$ and corresponding torque T based on the pump type and/or identification. The control unit may maintain a plurality of different LUTs or analytical conversion functions, where each LUT has been optimized for a given type of pump with a given set of specifications. The type of pump may be detected from operator input, pre-configuration at factory assembly.

According to some aspects, the control unit 150 is configurable in a first mode of operation and in a second mode of operation, where the first mode of operation and the second mode of operation are associated with different mappings between load pressure $P_{load}$ and corresponding torque T. For instance, the first mode of operation may be an energy efficient mode of operation where a minimum pump pressure is configured to maintain hydraulic functions on the machine 100. The mapping between load pressure and configured torque in this first mode of operation may be set to conserve energy spent, i.e., the resulting pump output pressures are as low as possible. The second mode of operation may be a boost mode of operation, where a margin pressure is configured. In this mode of operation, the mapping between load pressure and pump output pressure may be such as to generate an excess hydraulic flow by the pump 430. This excess flow, and over-pressure in the system, will result in a more responsive hydraulic system but at the expense of a reduction in energy efficiency. The remote control device 200 discussed above in FIG. 2 shows an example control input 240 which can be used by an operator to configure which mode of operation that should be active.

Figure 6:
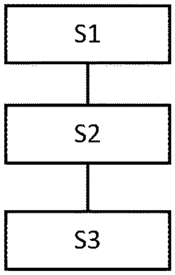
FIG. 6 is a flow chart illustrating methods.

FIG. 6 is a flow chart illustrating a method which summarizes the discussions above. There is illustrated a method performed by a control unit 150 for controlling a hydraulic system 300 on a construction machine 100, wherein the hydraulic system 300 comprises a hydraulic pump arrangement 310 comprising an electric drive motor 420 configured to drive a hydraulic pump 430 at a controllable drive torque T. The method comprises obtaining S1 a load pressure $P_{load}$ of at least one actuator 320 in the hydraulic system 300, converting S2 the load pressure $P_{load}$ into a corresponding target torque T, and controlling S3 the electric drive motor 420 to generate the target torque T, i.e., increasing or decreasing the motor load torque in dependence of a difference between current torque and target torque.

Figure 7:
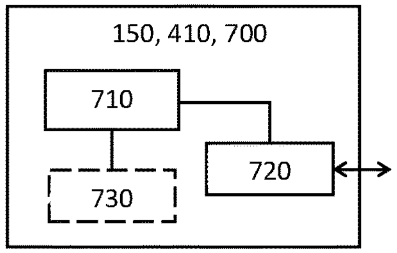
FIG. 7 schematically illustrates a control unit.

FIG. 7 schematically illustrates, in terms of a number of functional units, the general components of a control unit 700. This control unit can be used to implement, e.g., parts of the control device 150 or the pump control unit 410. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the device 700 to perform a set of operations, or steps, such as the methods discussed in connection to FIG. 5 and the discussions above. For example, the storage medium 730 may store the set of operations, and the processing circuitry 710 may be configured to retrieve the set of operations from the storage medium 730 to cause the device to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The device 150, 410, 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730.

Figure 8:
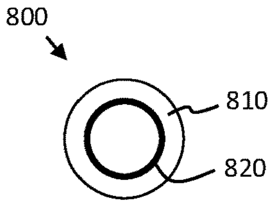
FIG. 8 schematically illustrates a computer program product.

FIG. 8 illustrates a computer readable medium 810 carrying a computer program comprising program code means 820 for performing the methods illustrated in FIG. 6, when said program product is run on a computer. The computer readable medium and the code means may together form a computer program product 800.

The invention claimed is:

1. A control unit for controlling a hydraulic system on a construction machine, wherein the hydraulic system comprises a hydraulic pump arrangement with an electric drive motor configured to drive a hydraulic pump at a controllable drive torque and/or controllable drive speed, wherein the control unit is arranged to obtain a load pressure of at least one actuator in the hydraulic system, to map the obtained load pressure to a target drive torque or a target drive speed based on a mapping between the load pressure and the target drive torque or the target drive speed, and to control the electric drive motor to generate the target drive torque or the target drive speed, and wherein the control unit is arranged to detect a type and/or identification of the hydraulic pump and to configure the mapping between the load pressure and the target drive torque or the target drive speed based on the pump type and/or identification.

2. The control unit according to claim 1, wherein the load pressure corresponds to a maximum load pressure in the hydraulic system, and wherein the target drive torque or the target drive speed is configured to generate an output pressure from the hydraulic pump in excess of the load pressure by a pre-determined margin pressure.

3. The control unit according to claim 1, wherein the load pressure is obtained from a pressure sensor arranged in connection to an actuator of the at least one actuator constituting a load of the hydraulic system.

4. The control unit according to claim 1, wherein the load pressure is mapped to the target drive torque or the target drive speed based on a look-up table, LUT, arranged accessible from the control unit.

5. The control unit according to claim 1, wherein the load pressure is mapped to the target drive torque or the target drive speed based on an analytical relationship between the load pressure and the target drive torque.

6. The control unit according to claim 5, wherein the analytical relationship between the load pressure and the target drive torque is given by $$T = \frac{V_g\, P}{20\, \pi\, \eta}[Nm]$$

where $V_g$ is a displacement per revolution of the pump in $cm^3$ and $\eta$ is a unitless hydraulic-mechanical efficiency parameter associated with the hydraulic pump arrangement.

7. The control unit according to claim 5, wherein the analytical relationship between the load pressure and the target drive torque is given by $$T = \frac{V_g\, P}{20\, \pi\, \eta} + \frac{d\omega}{dt}J[Nm]$$

where $V_g$ is a displacement per revolution of the pump in $cm^3$, η is a unitless hydraulic-mechanical efficiency parameter associated with the hydraulic pump arrangement, J is a sum of moments of inertia of the pump and the electric drive motor, and ω is a rotational velocity of an electric drive motor axle.

8. The control unit according to claim 1, wherein the target drive torque of the drive motor is compensated for a delta-pressure of a load sensing hydraulics system.

9. The control unit according to claim 1, arranged to receive a signal from a pressure sensor arranged to measure an actual pump output pressure, and to verify that the actual pump output pressure is within an acceptable range from an expected pump output pressure resulting from the target drive torque or the target drive speed.

10. The control unit according to claim 9, wherein the control unit is arranged to adjust the mapping between the load pressure and the target drive torque, or the target drive speed based on the actual pump output pressure.

11. The control unit according to claim 1, wherein the control unit is configurable in a first mode of operation and in a second mode of operation, wherein the mapping associated with the first mode of operation is different than the mapping associated with the second mode of operation.

12. A hydraulic system comprising the control unit according to claim 1.

13. The hydraulic system according to claim 12, wherein the electric drive motor is a variable speed electric motor and the hydraulic pump is a fixed displacement hydraulic pump.

14. A construction machine comprising the hydraulics system according to claim 12.

15. A control unit for controlling a hydraulic system on a construction machine, wherein the hydraulic system comprises a hydraulic pump arrangement with an electric drive motor configured to drive a hydraulic pump at a controllable drive torque and/or controllable drive speed, wherein the control unit is arranged to obtain a load pressure of at least one actuator in the hydraulic system, to convert the obtained load pressure into a target drive torque or a target drive speed, and to control the electric drive motor to generate the target drive torque or the target drive speed, wherein the control unit is arranged to receive a signal from a pressure sensor arranged to measure an actual pump output pressure, and to verify that the actual pump output pressure is within an acceptable range from an expected pump output pressure resulting from the target drive torque or the target drive speed.

16. The control unit according to claim 15, wherein the load pressure corresponds to a maximum load pressure in the hydraulic system, and wherein the target drive torque or the target drive speed is configured to generate an output pressure from the hydraulic pump in excess of the load pressure by a pre-determined margin pressure.

17. The control unit according to claim 15, wherein the load pressure is obtained from a pressure sensor arranged in connection to an actuator of the at least one actuator constituting a load of the hydraulic system.

18. The control unit according to claim 15, wherein the load pressure is mapped to the target drive torque or the target drive speed based on an analytical relationship between the load pressure and the target drive torque.

19. A control unit for controlling a hydraulic system on a construction machine, wherein the hydraulic system comprises a hydraulic pump arrangement with an electric drive motor configured to drive a hydraulic pump at a controllable drive torque and/or controllable drive speed, wherein the control unit is arranged to obtain a load pressure of at least one actuator in the hydraulic system, to convert the obtained load pressure into a target drive torque or a target drive speed, and to control the electric drive motor to generate the target drive torque or the target drive speed, wherein the load pressure is converted into the target drive torque or the target drive speed based on an analytical relationship between the load pressure and the target drive torque, wherein the analytical relationship between the load pressure and the target drive torque is given by $$T = \frac{V_g P}{20\pi\,\eta}[\mathrm{Nm}]$$

where $V_g$ is a displacement per revolution of the pump in $cm^3$ and η is a unitless hydraulic-mechanical efficiency parameter associated with the hydraulic pump arrangement, or wherein the analytical relationship between the load pressure and the target drive torque is given by $$T = \frac{V_g P}{20\pi\,\eta} + \frac{d\omega}{dt}J[\mathrm{Nm}]$$

where $V_g$ is a displacement per revolution of the pump in $cm^3$, η is a unitless hydraulic-mechanical efficiency parameter associated with the hydraulic pump arrangement, J is a sum of moments of inertia of the pump and the electric drive motor, and ω is a rotational velocity of an electric drive motor axle.

* * * * *